| United States Patent [19] | [11] Patent Number: 5,071,953 |
| Nakano et al. | [45] Date of Patent: Dec. 10, 1991 |

[54] METHOD FOR THE PREPARATION OF AMORPHOUS SYNDIOTACTIC STYRENE-BASED POLYMER AND A METHOD FOR SHAPING THE SAME

[75] Inventors: Akikazu Nakano; Masahiko Kuramoto; Masakazu Suzuki; Michihiro Sawada, all of Kimitsu, Japan

[73] Assignee: Idemitsu Kosan Company Limited, Tokyo, Japan

[21] Appl. No.: 358,349

[22] PCT Filed: Nov. 6, 1987

[86] PCT No.: PCT/JP87/00861

§ 371 Date: May 11, 1989

§ 102(e) Date: May 11, 1989

[87] PCT Pub. No.: WO89/04331

PCT Pub. Date: May 18, 1989

[51] Int. Cl.$^5$ .................................................. C08F 6/12
[52] U.S. Cl. ..................................... 528/492; 528/481; 528/487; 528/491; 528/494; 528/496; 528/497; 528/503; 264/216; 427/385.5
[58] Field of Search ............... 528/481, 503, 490, 492, 528/487, 491, 494, 496, 497; 264/216, 345; 427/385.5

[56] References Cited

U.S. PATENT DOCUMENTS 3,069,406 12/1962 Newman et al. ............ 526/348.1 X
3,449,270 6/1969 Saunders et al. ............ 526/347.2 X
4,680,353 7/1987 Ishihara et al. .................... 526/160

FOREIGN PATENT DOCUMENTS 0210615 4/1987 European Pat. Off. ............ 526/160
46-8988 3/1971 Japan ................................. 526/160

OTHER PUBLICATIONS

Ishihara et al., Synthesis and Properties of Polystyrene with New Stereoregularity, Polymer Preprints, 35(2).
Ishihara et al., Macromolecules, 19, 2465–2466, 1986.
Billmeyer, Jr., Textbook of Polymer Science, 2nd ed., Wiley-Interscience, 1971, 23–24.
Introduction to Makromol. Chem., (Seizo Okamura et al.), May 1, 1970, Kagakudojin, pp. 40–48, (Translation of 2.2, Molecular Weight and Distribution of Molecular Weight of High Molecules).

*Primary Examiner*—Fred Teskin
*Attorney, Agent, or Firm*—Frishauf, Holtz, Goodman & Woodward

[57] ABSTRACT

An amorphous and excellently moldable styrene-based polymer having a syndiotactic structure can be obtained when a styrene-based polymer having a substantially syndiotactic structure is dissolved in a solvent followed by separation and recovery of the polymer from the solution or melt thereof is quenched. Shaping the same gives various kinds of shaped articles having excellent mechanical strengths and heat resistance. Physical properties of the shaped articles can be further improved by a modification treatment.

28 Claims, No Drawings

METHOD FOR THE PREPARATION OF AMORPHOUS SYNDIOTACTIC STYRENE-BASED POLYMER AND A METHOD FOR SHAPING THE SAME

DESCRIPTION

1. Field of Technology

The present invention relates to a method for the preparation of an amorphous styrene-based polymer having a substantially syndiotactic structure and a method for shaping the polymer. The invention also relates to a method for the modification of a shaped article of the styrene-based polymer.

2. Background Technology

Known method in the prior art for the preparation of a styrene-based polymer includes the methods by the free-radical polymerization, cationic polymerization, anionic polymerization, polymerization by using a transition metal complex as the catalyst, radiation polymerization and the like. It is usual, however, that styrene-based polymers are prepared by the method of free-radical polymerization.

The styrene-based polymers prepared by the radical polymerization method have a stereospecificity of atactic structure in the molecular configuration and they are shaped by a variety of shaping methods such as injection molding, extrusion molding, blow molding, vacuum forming, casting and the like into shaped articles of different forms widely used in household electric appliances, office instruments, household commodities, containers for packaging, toys, furnitures, synthetic papers and other industrial materials.

The inventors have previously discovered that styrene-based monomers can be polymerized by using a catalyst composed of a special transition metal compound and an organic aluminum compound to give a styrene-based polymer having a stereospecificity of substantially syndiotactic structure in the crystallinity. Although these styrene-based polymers having a syndiotactic structure have physical and chemical properties quite different from those of the above mentioned polymers having an atactic structure and possess excellent characteristics in several respects, they have problems in the method for shaping into articles to which conventional methods of handling are hardly applicable because the extremely high melting point of the polymer as a consequence of the high crystallinity necessitates thermal molding undertaken at a higher temperature eventually to cause thermal degradation of the polymer and the behavior of the polymer in melting is quite different from that of the conventional polymers having an atactic structure necessitating a shaping method using a special solvent.

In view of the above described problems, an object of the present invention is to prepare a styrene-based polymer having a stereospecificity of substantially syndiotactic structure and having excellent moldability suitable for thermal molding at a relatively low temperature.

Another object of the present invention is to efficiently shape the thus prepared styrene-based polymer having good moldability and still another object thereof is to modify the thus shaped article of the styrene-based polymer.

DISCLOSURE OF THE INVENTION

Namely, the present invention provides:

a method for the preparation of an amorphous styrene-based polymer having a substantially syndiotactic structure which comprises dissolving a styrene-based polymer having a substantially syndiotactic structure (it may be referred to hereinbelow as the starting styrene-based polymer) in a solvent and then separating and recovering the polymer from the solution (preparation method I);

a method for the preparation of an amorphous styrene-based polymer having a substantially syndiotactic structure which comprises melting the above mentioned starting styrene-based polymer with heating or dissolving the same with heating in a solvent followed by quenching (preparation method II); a method for shaping the styrene-based polymer which comprises casting, spreading or applying the solution of the styrene-based polymer obtained in the course of the above described preparation method I followed by evaporation of the solvent (shaping method I);

a method for shaping the styrene-based polymer which comprises melting the above mentioned starting styrene-based polymer with heating or dissolving the same with heating in a solvent followed by quenching and then shaping (shaping method II); and a method for the modification of a shaped article of the styrene-based polymer which comprises subjecting a shaped article of an amorphous styrene-based polymer having a substantially syndiotactic structure to a heat treatment at a temperature of 120° to 250° C.

BEST MODE FOR PRACTICING THE INVENTION

The styrene-based polymer used as the starting material in the preparation methods I and II and shaping methods I and II of the present invention should have a substantially syndiotactic structure. The styrene-based polymer having a substantially syndiotactic structure implied here is meant by a styrene-based polymer of which the syndiotacticity determined by the analysis of the nuclear magnetic resonance of isotopic carbon ($^{13}$C-NMR) of at least 85% by the racemic diad or at least 35% or, preferably, at least 50% by the racemic pentad. Types of such a styrene-based polymer include, for example, polystyrenes, poly(alkyl styrenes), poly(halogenated styrenes), poly(alkoxy styrenes), poly(styrene benzoate) and mixtures thereof as well as copolymers and resin compositions mainly composed thereof. The poly(alkyl styrenes) here implied include poly(methyl styrenes), poly(ethyl styrenes), poly(isopropyl styrenes), poly(tert-butyl styrenes) and the like, the poly(halogenated styrenes) include poly(chloro styrenes), poly(bromo styrenes) and the like and the poly(alkoxy styrenes) include poly(methoxy styrenes), poly(ethoxy styrenes) and the like.

The above mentioned styrene-based polymer having a substantially syndiotactic structure used in the present invention can be prepared, for example, by the following method. Namely, it can be prepared by the polymerization of a styrene-based monomer (a monomer corresponding to the above named styrene-based polymer) in an inert hydrocarbon solvent or in the absence of any solvent by using a titanium compound and a condensation product of water and a trialkyl aluminum as a catalyst.

In the preparation method I of the present invention, the thus obtained styrene-based polymer having a substantially syndiotactic structure is used as the starting material and dissolved in a solvent. Among the various solvents usable here, it is preferable to use one kind or more selected from aromatic hydrocarbons, alicyclic hydrocarbons, halogenated hydrocarbons, cyclic amides, cyclic ethers and carbon disulfide. The aromatic hydrocarbons include, for example, benzene, toluene, xylene, ethyl benzene, methyl naphthalene, Tetralin and the like, the alicyclic hydrocarbons include, for example, cyclohexane, cyclohexene, methyl cyclohexane, ethyl cyclohexane, decahydro naphthalene and the like, the halogenated hydrocarbons include, for example, dichloromethane, chloroform, carbon tetrachloride, dichloroethane, trichloroethane, tetrachloroethane, trifluoroethane, Trichlene, chlorobenzene, dichlorobenzene, trichlorobenzene and the like, the cyclic amides include, for example, N-methyl pyrrolidone, N-ethyl pyrrolidone and the like and the cyclic ethers include, for example, tetrahydrofuran, dioxane and the like. These solvents can be used either singly or as a combination of two kinds or more.

In the preparation method I of the present invention, firstly, the above mentioned starting styrene-based polymer is dissolved in these solvents to prepare a solution of the polymer. The dissolving work and the temperature of the solution can be selected within appropriate ranges but it should usually be 200° C. or below or, preferably, 180° C. or below. However, it may exceed 200° C. under certain conditions. Suitable concentration of the polymer in this solution is usually in the range from 1 to 20% by weight though not particularly limitative. When the concentration is too low, an economical disadvantage is caused due to the increase in the amount of the solvent while, when it is too high, on the other hand, polymers having excellent moldability as desired cannot be obtained or difficulties are caused in handling due to the excessively high viscosity of the solution or inhomogeneity by the formation of a gelled material.

It is optional according to desire that the solution is admixed with various kinds of additives soluble in the solvent used including, for example, antioxidants, ultra-violet absorbers, heat stabilizers, flame retardants, anti-static agents, coloring agents and the like.

In the preparation method I of the present invention, the solution prepared in this manner is subjected to the removal of the insoluble matter contained in the solution according to need by a means such as filtration and the like. This filtration treatment is usually performed by the pressurization method by using a cotton cloth, flannel, glass wool, calico, combinations thereof and the like as a filtering material. When air bubbles are found in the solution, the air bubbles should be removed according to desire by a suitable means.

In the preparation method I of the present invention, the solvent is removed from the polymer solution prepared in the above described manner, from which the impurities and air bubbles have been removed according to need, to separate and recover the polymer. The method for the separation and recovery of the polymer is not particularly limitative and any of various methods conventionally undertaken can be used. For example, a method by re-precipitation, a method of precipitation by chilling, a method by evaporation or distillation of the solvent, a centrifugal method and the like as well as a method by the combination thereof can be named.

The applicable method by the above mentioned re-precipitation includes a conventional method in which the above mentioned polymer solution is brought into contact or mixed together with a liquid or compound capable of precipitating or depositing the polymer. To say particularly, a preferable method for the re-precipitation or deposition of the polymer is that the above mentioned polymer solution is added to, for example, methyl alcohol, ethyl alcohol, isopropyl alcohol, hexane, heptane or a mixed solvent thereof.

The above mentioned precipitation method by chilling is a method in which the solubility of the polymer is decreased by chilling the above mentioned solution to effect precipitation of the polymer. In this method, the yield of the precipitated and recovered polymer can be increased by appropriately selecting the parameters such as the kind of the solvent, concentration of the polymer, temperature after chilling and the like.

Incidentally, the polymer precipitated or deposited in the above described method by the re-precipitation or the precipitation method by chilling can be recovered by separating from the liquid by a conventional solid-liquid separating method such as filtration, centrifugal separation and the like and, according to need, washing by using a suitable washing liquid followed by drying. The above mentioned washing liquid is exemplified by methyl alcohol, ethyl alcohol, isopropyl alcohol, pentane, hexane, heptane, water and the like as well as mixtures thereof, of which methyl alcohol is particularly preferred. The method for drying in this case is not particularly limitative and any of the methods conventionally undertaken can be used. For example, a drying method under reduced pressure, a drying method by air blowing, a drying method by heating and the like as well as a method by the combination thereof can be named. In each of the drying methods, meanwhile, the drying temperature should desirably be set not to exceed 150° C. or, preferably, not to exceed 100° C.

The above mentioned method by the evaporation or distillation of the solvent includes a drying method under reduced pressure, a drying method by air blowing, a drying method by heating, a spontaneous drying method, a distillation method under reduced pressure, a distillation method under normal pressure and the like as well as a method by the combination thereof, of which the drying method by heating under reduced pressure and the like are preferred.

Incidentally, in each of the methods of drying by heating and the like, the working temperature should preferably within the range of 150° C. or below.

To give a more detailed description, the method for the recovery of the styrene-based polymer includes a method in which, for example, the polymer solution is added dropwise into a poor solvent of the polymer such as methyl alcohol and the like to precipitate the polymer in a particulate form which is subjected to drying under reduced pressure to give a resin in a particulate form or the polymer solution is dried under reduced pressure to give a plate-like shaped body from which a resin in a particulate form is prepared by chopping up or others.

By undertaking the above described method, the above mentioned starting styrene-based polymer used can be recovered as an amorphous styrene-based polymer having a substantially syndiostatic structure.

Besides, the amorphous styrene-based polymer having a substantially syndiotactic structure can be prepared also by the above described preparation method II. In this preparation method II, firstly, the above mentioned starting styrene-based polymer is melted with heating or dissolved in a solvent with heating. The temperature for melting with heating should usually be from 260° C. to 350° C. or, preferably, from 280° to 330° C. though dependent on the types of the starting styrene-based polymer used. When it is dissolved in a solvent with heating, suitable solvents include various kinds of the solvents used in the above described preparation method I such as aromatic hydrocarbons, alicyclic hydrocarbons, halogenated hydrocarbons, cyclic amides, cyclic ethers and carbon disulfide as well as mixtures thereof, of which aromatic hydrocarbons can be used satisfactorily.

In the preparation method II of the present invention, it is necessary that the starting styrene-based polymer is melted or dissolved completely in the above described manner followed by quenching. This quenching procedure serves to convert the styrene-based polymer having a syndiotactic structure as the starting material into amorphous with improvement in the moldability. Therefore, quenching should be performed under such conditions that the above mentioned starting styrene-based polymer could be converted into amorphous. Although the conditions are not particularly limitative, the velocity of temperature decrease should be as high as possible so that, in particular, the temperature should be decreased to 100° C. or below at a cooling velocity of at least 50° C./minute or, preferably, at least 100° C./minute.

Thus, the desired amorphous styrene-based polymer having a substantially syndiotactic structure can be obtained by undertaking such a quenching procedure and, in the case of a solution, by further removing the solvent according to need.

The styrene-based polymer obtained by the preparation method I or II of the present invention as described above is amorphous and, despite the substantially syndiotactic structure, has good moldability. Besides, this amorphous styrene-based polymer can be shaped at a temperature higher than the glass transition temperature so that thermal molding thereof can be performed at a relatively low temperature or, in other words, at a temperature where thermal degradation of the polymer does not take place. Further, the amorphous styrene-based polymer is imparted with improved solubility characteristics in solvents so that it can be used satisfactorily in a shaping method by using a solvent, if necessary. In short, the amorphous styrene-based polymer having a substantially syndiotactic structure can be shaped satisfactorily by various shaping methods such as thermal molding method, shaping method using a solvent and the like or, in particular, by various shaping methods such as the thermal molding method and the like undertaken in the prior art in the shaping fabrication of styrene-based polymers having an atactic structure including, more particularly, the methods of, for example, compression molding, injection molding, extrusion molding, blow molding, vacuum forming, pouring molding, shaping by casting in a mold, shaping by spreading, shaping by application, shaping by spinning, shaping by coating such as by the dipping method, brushing method, spraying method and the like, and so on.

In the following, the shaping method I is described. This shaping method I is a method in which the solution obtained in the working procedure of the above described preparation method-I is cast in a mold, spread or applied to an objective body followed by evaporation of the solvent. Though not particularly limitative, the concentration of the polymer in the solution here should be selected usually in the range from 0.1 to 20% by weight. When the concentration is too low, shaping in a desired thickness can hardly be achieved in a single working by the spreading method, coating method and the like with, in addition, an economical disadvantage due to the unduly large amount of the solvent. When the concentration is too high, on the other hand, difficulties are encountered in handling and shaping as a consequence of an increased viscosity or inhomogeneity caused by the formation of a gel-like material.

In this shaping method I, the above described solution is cast in a mold having a desired form, spread over the surface of a substrate made of a metal or glass or applied to the surface of an objective body such as the desired shaped article to form a coating layer thereon followed by evaporation of the solvent contained therein. The solvent can be evaporated by any method without particular limitations including evaporation at room temperature, evaporation by heating at an appropriate temperature and evaporation under normal pressure or under reduced pressure.

Films and sheets can be shaped usually by the method in which the solution is spread over the surface of a metal- or glass-made substrate having a flat and uniform surface. Metal-made substrates are preferred for industrial production. Suitable metal-made substrates include, for example, those made of nickel, chrome, copper or stainless steel, those provided with a nickel plating, those by providing an iron-made substrate with a cladding of a copper layer and, further thereon, a nickel layer, those by providing an iron-made substrate with a cladding of a layer of a nickel-chromium alloy, and the like.

Further, the method of coating the surface of a shaped article and the like with the solution may be any of the coating methods conventionally undertaken in the prior art such as dipping method, brush-coating method, spraying method and the like.

In the shaping method II of the present invention, on the other hand, the amorphous styrene-based polymer having a substantially syndiotactic structure obtained by quenching in the procedure of the above described preparation method II is shaped as such or after being subjected to a variety of treatments according to need. Shaping here can be performed by various methods of thermal molding such as compression molding, extrusion molding, injection molding and the like and the molding temperature there can be greatly decreased in comparison with a styrene-based polymer obtained by omitting the quenching procedure.

According to the shaping method I or II as described above, various kinds of shaped articles, such as cast articles, films, sheets, laminates, coating films and the like, of the amorphous styrene-based polymer having a substantially syndiotactic structure can be obtained very easily.

As compared to the hitherto known shaped articles of styrene-based polymers, the cast articles, films, sheets, laminates, coating films and the like obtained in this manner are outstandingly excellent in mechanical strengths and heat resistance.

According to the modification method of the present invention, in the next place, various kinds of the shaped articles of the amorphous styrene-based polymer having a substantially syndiotactic structure obtained in the above described shaping method I or II should necessarily be subjected to a heat treatment at a temperature of 120° to 250° C. Undesirably, the heat resistance cannot be improved at a temperature lower than 120° C. and decomposition of the polymer takes place when the temperature exceeds 250° C. The heating time should usually be from 5 minutes to 100 hours or, preferably, from 10 minutes to 10 hours. It is preferable that this heat treatment is undertaken in an atmosphere of an inert gas such as argon gas, nitrogen gas and the like.

The shaped article after the modification treatment obtained in this manner has an increased mechanical strength and is imparted with excellent heat resistance incredible as compared to hitherto known polystyrene and the like.

In the following, the present invention is described in more detail by way of examples.

REFERENCE EXAMPLE 1

(Preparation of a polystyrene having a substantially syndiotactic structure)

Into a reaction vessel were introduced 2 liters of toluene as the solvent and 20 m moles of cyclopentadienyl titanium trichloride and 0.8 mole as aluminum atoms of methyl aluminoxane as the catalytic ingredients and then the polymerization reaction was performed for 1 hour with addition of 3.6 liters of styrene at 20° C. After completion of the reaction, the product was washed with a liquid mixture of hydrochloric acid and methyl alcohol to decompose and remove the catalytic ingredients. Subsequent drying gave 330 g of a polymer. This polymer was subjected to extraction in a Soxhlet extractor with methyl ethyl ketone as the solvent go vie 95% by weight of the unextracted matter. This polymer had a weight-average molecular weight of 280,000, number-average molecular weight of 57,000 and melting point of 270° C. Further, the analysis (solvent: 1,2-dichlorobenzene) by the nuclear magnetic resonance of the isotopic carbon ($^{13}$C-NMR) indicated an absorption at 145.35 ppm assignable to the syndiotactic structure and the syndiotacticity of the racemic pentad was 96% as calculated from the area of the peak.

REFERENCE EXAMPLE 2

(Preparation of a polystyrene having a substantially syndiotactic structure)

Into a reaction vessel were introduced 20 ml of toluene as the solvent for reaction and 0.05 m mole of tetraethoxy titanium and 5 m moles as a aluminum of methyl aluminoxane as the catalytic ingredients and then the polymerization reaction was performed for 4 hours with addition of 150 ml of styrene at 50° C.

After completion of the reaction, the product was washed with a liquid mixture of hydrochloric acid and methyl alcohol to decompose and remove the catalytic ingredients. Subsequent drying gave 28 g of a polymer (polystyrene). Thereafter, this polymer was subjected to extraction in a Soxhlet extractor with methyl ethyl ketone as the solvent to give 95% by weight of the unextracted matter. This unextracted matter had a weight-average molecular weight of 500,000, number-average molecular weight of 180,000 and melting point of 270° C. Further, this polymer indicated an absorption at 145.35 ppm assignable to the syndiotactic structure in the analysis by $^{13}$-C-NMR and the syndiotacticity of the racemic pentad was 95% as calculated from the area of the peak thereof.

REFERENCE EXAMPLE 3

(Preparation of a styrene-based polymer having a substantially syndiotactic structure)

Into a reaction vessel were introduced 60 ml of toluene as the solvent for reaction, 0.05 m mole of tetraethoxy titanium and 5 m moles as aluminum atoms of methyl aluminoxane and then the polymerization reaction was performed for 2 hours with addition of 0.45 mole of styrene and 0.05 mole of p-methyl styrene at 50° C.

After completion of the reaction, the product was washed with a liquid mixture of hydrochloric acid and methyl alcohol to decompose and remove the catalytic ingredients. Subsequent drying gave 6.4 g of a copolymer. Thereafter, this copolymer was subjected to extraction in a Soxhlet extractor with methyl ethyl ketone as the solvent to give 80% by weight of the unextracted matter. This unextracted copolymer had a weight-average molecular weight of 440,000, number-average molecular weight of 240,000 and melting point of 227° C. This copolymer contained the p-methyl styrene moiety in a proportion of 18% by moles. Further, this copolymer indicated an absorption at 145.35 ppm in the analysis by $^{13}$C-NMR and the syndiotacticity at the racemic pentad of the styrene moiety was 72% as calculated from the area of the peak thereof.

EXAMPLE 1

Into a flask of 300 ml capacity were introduced 2.5 g of the powdery polystyrene obtained in Reference Example 1 and 47.5 g of chloroform and a clear solution in a concentration of 5% by weight was obtained by dissolving at 60° C. This solution was added dropwise to 200 ml of methyl alcohol contained in a beaker under agitation at a dropping rate of 2 to 3 drops per second. The particles precipitated in this manner were collected by filtration and dried at room temperature under reduced pressure to give translucent polystyrene particles having a diameter of 2 to 3 mm.

In the next place, the polystyrene particles kept at 150° C. for 5 minutes were compression-molded using a molding press under a pressure of 50 kg/cm²G for 5 minutes and then 200 kg/cm²G for 10 minutes. A translucent film was obtained as a result.

EXAMPLE 2

A 5 g portion of the polystyrene powder obtained in Reference Example 1 was added to 95 g of p-xylene and dissolved at 138° C. The thus obtained solution in a concentration of 5% by weight was poured into a copper-made box of 5 cm by 5 cm square wide and cooled to room temperature followed by drying under reduced pressure to give a translucent plate-like shaped body having a thickness of 2 mm. This plate-like shaped body was chopped into small particles and the small particles were compression-molded in the same manner as in Example 1 to give a translucent film as a result.

EXAMPLE 3

A 1 g portion of the polystyrene powder obtained in Reference Example 1 was added to 99 g of tetrahydrofuran and dissolved at 65° C. The thus obtained solution in a concentration of 1% by weight was poured into a glass dish having a diameter of 5 cm and dried at room temperature to give a translucent plate-like shaped body having a thickness of 0.5 mm. This plate-like shaped body was chopped into small particles and the small particles were compression-molded in the same manner as in Example 1 to give a translucent film as a result.

EXAMPLE 4

A 2.5 g portion of the powder of the styrene-based copolymer obtained in Reference Example 3 was added to 47.5 g of decahydronaphthalene and dissolved at 180° C. The thus obtained solution in a concentration of 5% by weight was added dropwise to 250 ml of hexane under agitation at a rate of 2 to 3 drops per second. The particles precipitated in this manner were collected by filtration and dried at room temperature under reduced pressure to give white small particles having a diameter of 2 to 3 mm. Subsequent compression-molding in the same procedure as in Example 1 gave a translucent film as a result.

COMPARATIVE EXAMPLE 1

The powdery polystyrene obtained in Reference Example 1 was compression-molded under the same conditions as in Example 1 without dissolving in a solvent. In this case, no film could be obtained but what was obtained was an aggregate of the polystyrene particles.

EXAMPLE 5

A 2.5 g portion of the polystyrene powder obtained in Reference Example 1 was taken in a flask of 300 ml capacity together with 47.5 g of chloroform and dissolved therein with heating to give a clear solution in a concentration of 5% by weight. This solution as poured into a glass dish and dried under hot air stream at 100° C. to give a transparent film.

EXAMPLE 6

The film obtained in Example 5 was subjected to a heat treatment at 180° C. for 5 hours in an atmosphere of nitrogen gas to give a white film. The thus obtained film had a melting point of 269° C. as determined (differential scanning calorimetric analysis) with an object to test the heat resistance. The Vicat softening point thereof was 200° C.

COMPARATIVE EXAMPLE 2

A polystyrene having a stereospecificity of an atactic structure prepared by the radical polymerization method (Idemitsu Styrol NF 20, a product by Idemitsu Petrochemical Co., Ltd.) was subjected to the determination of the Vicat softening point to give a result of 99° C.

EXAMPLE 7

A piece of aluminum of 10 mm by 10 mm wide and 1 mm thick was immersed for 5 seconds at room temperature in a chloroform solution of a polystyrene obtained in the same manner as in Example 5 and then the piece of aluminum was dried in a hot air stream to give a piece of aluminum coated with a transparent thin film of the polystyrene.

EXAMPLE 8

The polystyrene-coated aluminum piece obtained in Example was subjected to a heat treatment at 130° C. for 1 hour in an atmosphere of nitrogen gas. The heat-treated coating film obtained in this manner was peeled off and the melting point thereof was determined to give a result of 268° C.

EXAMPLE 9

A 2.5 g portion of the polystyrene powder obtained in Reference Example 1 was dissolved in 47.5 g of p-xylene to give a p-xylene solution in a-concentration of 5% by weight. This solution was poured into a glass dish and dried at room temperature under reduced pressure to give a transparent film.

EXAMPLE 10

The film obtained in Example 9 was subjected to a heat treatment at 240° C. for 100 hours in an atmosphere of argon gas. The melting point of the thus obtained white film was determined to give a result of 270° C.

EXAMPLE 11

A 2.5 g portion of the powder of the polystyrene-based copolymer obtained in Reference Example 3 was dissolved in 47.5 g of p-xylene to give a p-xylene solution. This solution was poured into a glass dish and dried at room temperature under reduced pressure to give a transparent film.

The thus obtained film was subjected to a heat treatment at 180° C. for 10 hours in an atmosphere of nitrogen gas. The thus obtained white film had a melting point of 227° C.

EXAMPLE 5

A 2.5 g portion of the polystyrene powder obtained in Reference Example 1 was dissolved in 47.5 g of N-methyl pyrrolidone to give an N-methyl pyrrolidone solution of 5% by weight. This solution was poured into a glass dish and dried at 70° C. under reduced pressure to give a film.

EXAMPLE 13

A 2.5 g portion of the polystyrene powder obtained in Reference Example 1 was dissolved in 47.5 g of ethyl benzene to give an ethyl benzene solution of 5% by weight. The same aluminum piece as used in Example 7 was immersed for 5 seconds at 100° C. in this solution and taken out followed by drying at room temperature under reduced pressure to give an aluminum piece coated with a thin film of the polystyrene.

EXAMPLE 14

The same aluminum piece as described above was coated with the ethyl benzene solution obtained in Example 13 by using a brush followed by drying at room temperature under reduced pressure to give an aluminum piece coated with a thin film of the polystyrene.

EXAMPLE 15

A 2.5 g portion of the polystyrene powder obtained in Reference Example 1 was dissolved in 249.75 g of dichloromethane to give a solution in a concentration of 0.1% by weight. This solution was poured into a glass dish and dried at 60° C. to give a film.

EXAMPLE 16

A 1 g portion of the polystyrene powder obtained in Reference Example 1 was dissolved in 99 g of tetrahydrofuran to give a solution-in a concentration of 1% by weight. This solution was poured into a glass dish and dried at 60° C. to give a film.

EXAMPLE 17

A 2.5 g portion of the powder of the styrene-based copolymer obtained in Reference Example 3 was dissolved in 47.5 g of p-xylene to give a p-xylene solution. This solution was poured into a glass dish and dried at room temperature under reduced pressure to give a film.

EXAMPLE 18

A 2.5 g portion of the powder of the styrene-based copolymer obtained in Reference Example 3 was dissolved in 47.5 g of decahydronaphthalene to give a decahydronaphthalene solution. This solution was poured into a glass dish and dried at room temperature under reduced pressure to give a film.

EXAMPLE 19

The polystyrene obtained in Reference Example 1 was fed to an extruder machine and melted and kneaded therein at 300° C. followed by extrusion out of an orifice and quenched by directly introducing into ice water. The thus obtained resin in a filament-like form was chopped to give pellets. The thus obtained pellets were amorphous and could be shaped by fusion at 200° C.

COMPARATIVE EXAMPLE 3

The polystyrene obtained in Reference Example 1 was fed to an extruder machine and melted and kneaded therein at 300° C. followed by extrusion out of an orifice and annealed in air. The thus obtained resin in a filament-like form was chopped to give pellets. The thus obtained pellets could be shaped by fusion only when heated up to a temperature of 300° C.

EXAMPLE 20

A 1 g portion of the polystyrene powder obtained in Reference Example 2 was dissolved in 49 g of chloroform to give a solution which was poured into a glass dish and dried under a stream of hot air at 100° C. to give a film having a thickness of 40μm. This film was subjected to a heat treatment at 230° C. for 5 minutes in an atmosphere of nitrogen gas.

A test piece having a width of 3 mm and a length of 30 mm was taken by cutting the thus obtained heat-treated film and the test piece was heated at a rate of temperature elevation of 10° C./minute as it was stressed with a load of 1 g in the longitudinal direction to determine the thermal deformation temperature of the film. The result was that the film had a thermal deformation temperature of 185.5° C.

EXAMPLE 21

The procedure undertaken was the same as in Example 20 except that the length of time for the heat treatment was 20 minutes. The result was that the film had a thermal deformation temperature of 240.6° C.

EXAMPLE 22

The procedure undertaken was the same as in Example 20 except that the starting material was the styrene-based copolymer obtained in Reference Example 3 and the heat treatment was performed under the conditions of 180° C. for 60 minutes. The result was that the film had a thermal deformation temperature of 195.4° C.

COMPARATIVE EXAMPLE 4

The procedure undertaken was the same as in Example 20 except that the starting material used was a polystyrene having an atactic structure in the stereospecificity (Idemitsu Styrol NF 20, a product by Idemitsu Petrochemical Co., Ltd.) and the heat treatment was omitted. The result was that the film had a thermal deformation temperature of 108.6° C.

POSSIBILITY OF INDUSTRIAL UTILIZATION

The amorphous styrene-based polymers having a substantially syndiotactic structure obtained according to the present invention as well as shaped articles thereof or modified shaped articles thereof can be effectively and widely utilized as various kinds of instruments such as household electric appliances and the like, various kinds of equipments such as office machines and the like or machine parts, daily necessaries such as household commodities, toys, furnitures, synthetic papers, various kinds of other industrial materials and so on.

We claim:

1. A method for forming a shaped styrene polymer which comprises dissolving a syndiotactic styrene polymer having a syndiotacticity of at least 35% in terms of the racemic pentad in a solvent to form a solution, applying said solution on a surface to form a layer thereon and evaporating the solvent to form a shaped amorphous styrene polymer.

2. The method of claim 1 wherein said solvent is at least one selected from the group consisting of aromatic hydrocarbons, alicyclic hydrocarbons, halogenated hydrocarbons, cyclic amides, cyclic ethers and carbon disulfide.

3. The method of claim 1 wherein said styrene polymer is selected from the group consisting of polymers and copolymers of styrene, alkyl styrenes, halogenated styrenes, alkoxystyrenes, and styrene benzoate and mixtures thereof.

4. The method of claim 1 wherein said syndiotactic styrene polymer is dissolved in said solvent at a temperature not exceeding 200° C.

5. The method of claim 1 wherein said syndiotactic styrene polymer has a syndiotacticity of at least 50% in terms of the racemic pentad.

6. The method of claim 1 wherein said solution is applied to form a thin layer form which the solvent is evaporated.

7. The method of claim 1 wherein said solution contains from 0.1 to 20% by weight of dissolved styrene polymer.

8. The method of claim 7 wherein said syndiotactic styrene polymer has a syndiotacticity of at least 50% in terms of the racemic pentad; and wherein said solution is applied to form a thin layer from which the solvent is evaporated.

9. The method of claim 8 wherein said solvent is at least one selected from the group consisting of aromatic hydrocarbons, alicyclic hydrocarbons, halogenated hydrocarbons, cyclic amides, cyclic ethers and carbon disulfide; and wherein said styrene polymer is selected from the group consisting of polymers and copolymers of styrene, alkyl styrenes, halogenated styrenes, alkoxystyrenes, and styrene benzoate and mixtures thereof.

10. The method of claim 8 wherein said syndiotactic styrene polymer is a syndiotactic polystyrene.

11. The method of claim 10 wherein said syndiotactic polystyrene has a syndiotacticity of at least 90% in terms of the racemic pentad.

12. The method of claim 9 wherein said syndiotactic styrene polymer is a copolymer of styrene and p-methylstyrene.

13. The method of claim 12 wherein said copolymer has a syndiotacticity of about 72% in terms of the racemic pentad.

14. A method for preparing an amorphous syndiotactic styrene polymer having a syndiotacticity of at least 35% in terms of the racemic pentad which comprises dissolving said syndiotactic styrene polymer in a solvent to form a solution and then separating and recovering amorphous syndiotactic styrene polymer from said solution.

15. The method of claim 14 wherein said solvent is at least one selected from the group consisting of aromatic hydrocarbons, alicyclic hydrocarbons, halogenated hydrocarbons, cyclic amides, cyclic ethers and carbon disulfide.

16. The method of claim 14 wherein the styrene based polymer is dissolved in the solvent at a temperature not exceeding 200° C.

17. The method of claim 14 wherein said amorphous polymer is rapidly precipitated from said solution by chilling or by addition of another liquid to the solution which causes the amorphous polymer to precipitate.

18. The method of claim 14 wherein said amorphous polymer is recovered from the solution by rapidly removing the solvent at a temperature not higher than 100° C.

19. The method of claim 14 wherein said syndiotactic styrene polymer has a syndiotacticity of at least 50% in terms of the racemic pentad.

20. The method of claim 19 wherein said solvent is at least one selected from the group consisting of aromatic hydrocarbons, alicyclic hydrocarbons, halogenated hydrocarbons, cyclic amides, cyclic ethers and carbon disulfide; and wherein the styrene based polymer is dissolved in the solvent at a temperature not exceeding 200° C.; and wherein said amorphous polymer is rapidly precipitated from said solution by chilling or by addition of another liquid to the solution which causes the amorphous polymer to precipitate.

21. The method of claim 19 wherein said solvent is at least one selected from the group consisting of aromatic hydrocarbons, alicyclic hydrocarbons, halogenated hydrocarbons, cyclic amides, cyclic ethers and carbon disulfide; and wherein the styrene based polymer is dissolved in the solvent at a temperature not exceeding 200° C.; and wherein said amorphous polymer is recovered from the solution by rapidly removing the solvent at a temperature not higher than 100° C.

22. The method of claim 14 wherein said styrene polymer is selected from the group consisting of polymers and copolymers of styrene, alkyl styrenes, halogenated styrenes, alkoxystyrenes, and styrene benzoate and mixtures thereof.

23. The method of claim 20 wherein said styrene polymer is selected from polymers and copolymers of styrene, alkyl styrenes, halogenated styrenes, alkoxystyrenes, and styrene benzoate and mixtures thereof.

24. The method of claim 21 wherein said styrene polymer is selected from polymers and copolymers of styrene, alkyl styrenes, halogenated styrenes, alkoxystyrenes, and styrene benzoate and mixtures thereof.

25. The method of claim 20 wherein said polystyrene polymer is polystyrene having a syndiotacticity of at least 90% in terms of the racemic pentad.

26. The method of claim 21 wherein said polystyrene polymer is polystyrene having a syndiotacticity of at least 90% in terms of the racemic pentad.

27. The method of claim 20 wherein said polystyrene polymer is a copolymer of styrene and p-methylstyrene.

28. The method of claim 21 wherein said polystyrene polymer is a copolymer of styrene and p-methylstyrene.

* * * * *